Figure 1:
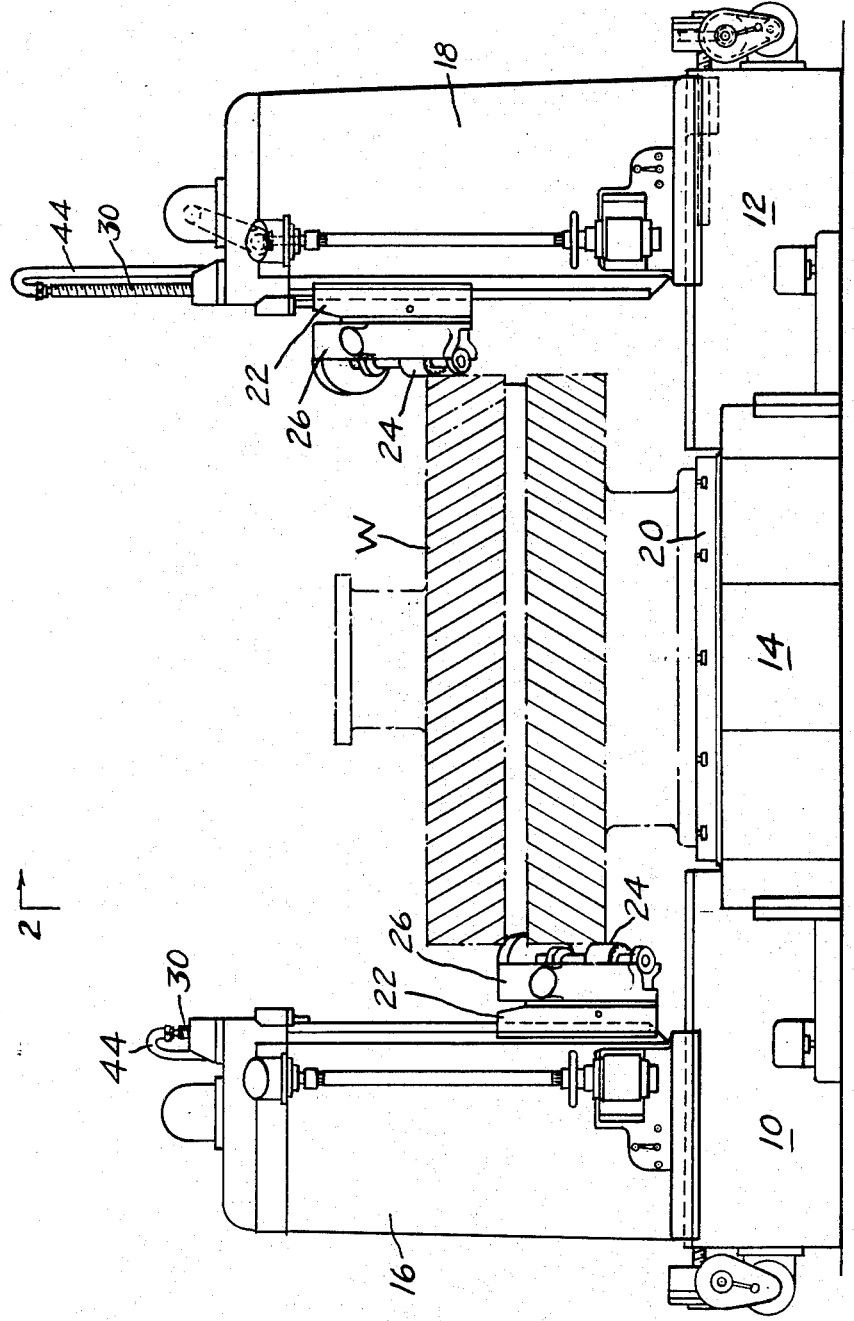

Dec. 10, 1963   G. DAVENPORT   3,113,488
MACHINE TOOL LEAD SCREW
Filed June 24, 1960   3 Sheets-Sheet 1

INVENTOR.
GRANGER DAVENPORT
BY
L. M. Smith, Jr.
ATTORNEY

Dec. 10, 1963 G. DAVENPORT 3,113,488
MACHINE TOOL LEAD SCREW
Filed June 24, 1960 3 Sheets-Sheet 3

INVENTOR.
GRANGER DAVENPORT
BY
J. M. Smith, Jr.
ATTORNEY 3,113,488
MACHINE TOOL LEAD SCREW
Granger Davenport, Montclair, N.J., assignor to Norton Company, Worcester, Mass., a corporation of Massachusetts
Filed June 24, 1960, Ser. No. 38,510
1 Claim. (Cl. 90—4)

The invention relates to machine tools and more particularly to a temperature-controlled lead screw for hobbing machines.

In the machining of gears, it is of great importance that they be as accurate as possible so that they will mesh properly with other gears and give long service and carry the load. Machines used in cutting gears by the hobbing method usually employ an accurately machined lead screw to feed the hob or cutter across the face of the gear blank being cut. The dimensional accuracy of a lead screw is difficult to maintain due to variations in the heat generated by the cutting action of the hob and elsewhere in the machine as in its driving train and transmitted to the screw through its support housing, causing the lead screw to elongate irregularly, resulting in helix-angle and lead error in the gear being cut. The adverse effect on the accuracy of a gear due to this error is objectionable, especially when cutting large and expensive gears of the helical type used in the manufacture of large turbines.

Double-headed hobbing machines used for cutting double-helical gears simultaneously utilizing two hobs, one for cutting the right-hand helix and the other for cutting the left-hand helix, employ two independent lead screws which must be a matched set of high accuracy. Here again, this error, which may not be the same for both lead screws, adversely affects the critical relationship between the respective lead screws. For example, during the machining operation, one lead screw may be elongated to a greater extent than the other, thereby causing two different helix angles to be machined on the gear.

Different means have been devised for minimizing these errors, such as the use of refrigerated lubricating oil and coolant flooding the cutter and the gear being cut, and including a temperature controlled room in which the machine is housed. But the use of a temperature controlled room to minimize such errors is relatively costly in view of the substantial amount of equipment required for its construction, and is time consuming in use, since it provides for the extraction of heat from various parts of the machine solely by external cooling, and hence relatively slowly, especially from the internal parts of the machine. Moreover, whenever the machine is initially started, a substantial amount of time is consumed during the relatively protracted preliminary warm-up period required for all parts of the entire machine to normalize under controlled temperature conditions before the machining operation can be undertaken. Finally, even during machining operations in a temperature controlled environment, local hot spots are produced in gear trains operating under load, at bearing surfaces due to friction, and by the cutting action of the cutting tool or hob. Such factors impose inherent limitations upon the utility of a temperature controlled room for minimizing errors in the gears produced, particularly when extreme accuracy is required. Therefore, the utility of a temperature controlled room can be enhanced by the incorporation of the instant invention in the gear hobber contained in such a room, to provide precisely controlled internal cooling in a critical portion of the machine to minimize the adverse effect of local hot spots in the machine.

Other means such as the lead compensators disclosed in United States Patents #2,232,704 to Hughes and #2,773,428 to Batorski have been devised to compensate for errors in the helix angles, but they are complex devices not practical for application to large gear hobbers. Here again, the relatively simple and compact device comprising the instant invention may be applied to large gear hobbers for cutting large gears with extreme accuracy.

The instant invention, in its various applications, contemplates the provision of means for maintaining the dimensional stability of a lead screw in a machine tool such as a gear hobber by means of a precisely regulated temperature control system arranged to circulate a heat exchange medium internally of the lead screw with which it is operatively associated.

It is therefore one object of this invention to provide means for maintaining a uniform temperature of the lead screw from one end to the other to overcome the effects of local hot spots from adjacent bearings and from the nut engaging the lead screw that tend to change the pitch or lead or helix angle of the screw, resulting in corresponding errors in the workpiece.

Another object is to provide a rigid and highly accurate hollow lead screw through which may be passed a temperature controlling fluid.

A further object is to provide means to control the temperature of the fluid at will by a thermostatic control to shorten or lengthen the effective lead motion generated by the screw.

A still further object is to provide independent temperature control means for each lead screw of a matched pair on a given machine permitting minor modification of lead on either of the lead screws so as to produce an absolutely accurate gear.

Figure 2:
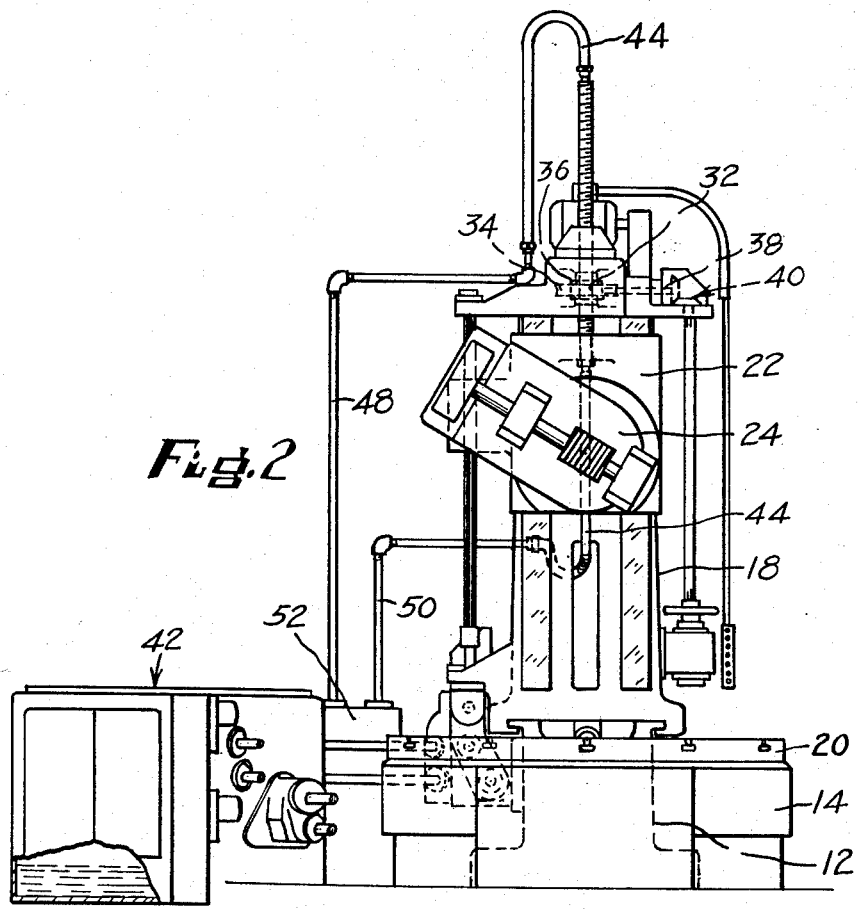
Figure 3:
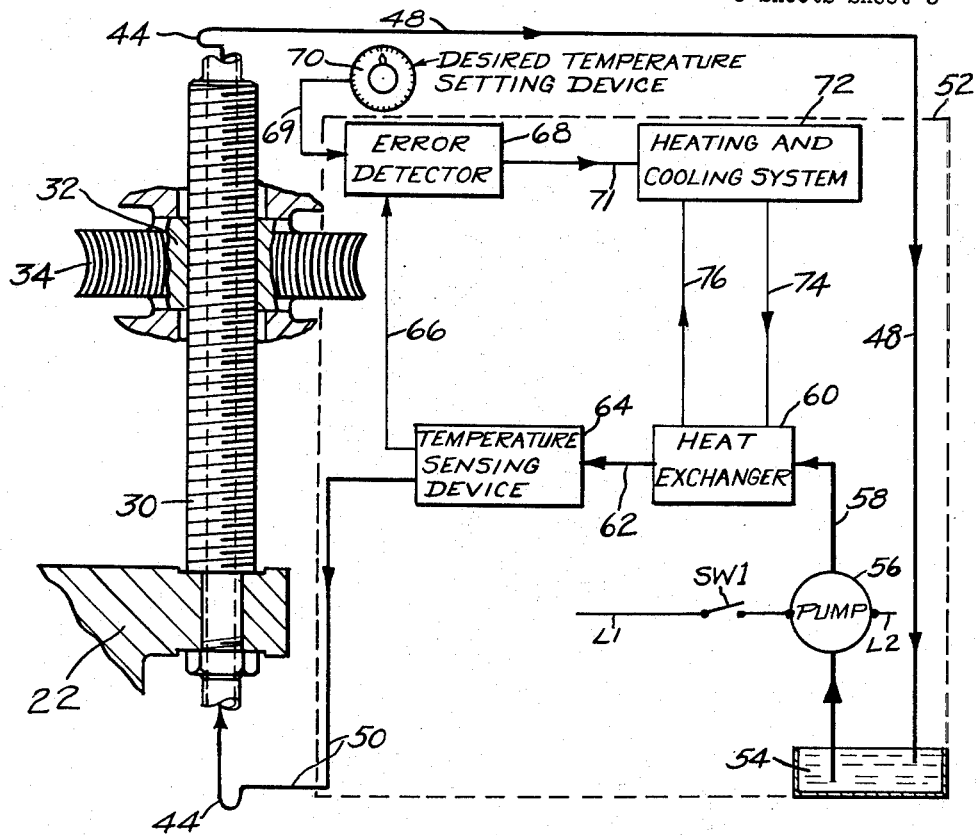

With the foregoing and other objects in view, the invention consists in the construction, combination and arrangement of parts hereinafter described and illustrated in the drawings, in which, FIG. 1 is a front elevation of a double-head hobbing machine, FIG. 2 is a view of the right-hand hobbing head, taken approximately on line 2—2 of FIG. 1, and FIG. 3 is a diagrammatic representation of the temperature controlling apparatus of the invention.

Referring to the drawing, the hobbing machine shown as exemplary of one application of the instant invention is the type used for cutting a large double-helical gear which employs a pair of cutting heads, one which cuts the right-hand helix and the other the left-hand helix, the gear being in the order of ten feet in diameter. The hobbing machine shown is substantially that disclosed in various prior United States patents to W. F. Zimmermann including #2,211,309 disclosing the construction of and operation of the cutter heads, #2,183,362 and #2,183,363 disclosing details of the tool supports or stanchions and mounting of the work support or table, and #2,330,168 disclosing a similar machine enclosed in a temperature controlled room, to which reference may be had for details not disclosed herein.

It is deemed unnecessary to describe in detail the construction of the hobbing machine since only the lead screws and the associated circulating and temperature controlling apparatus therefor are the subject matter of this invention. Hence only a general description of the hobbing machine will be given.

The hobbing machine disclosed comprises main base or frame members 10, 12 and 14 upon which are mounted respectively vertical tool supports or stanchions 16 and 18 and a rotatable work support or table 20. Each of the stanchions 16 and 18 has slidably mounted thereon a tool carriage 22 which supports a rotatable vertically movable cutter or hob 24 mounted on a swivel tool head 26. The gear blank represented at W is adapted to be mounted and centered upon the table 20 in cooperative relation with the tool heads 26.

A hollow lead or feed screw 30 provided at each of the stanchions is anchored to one of the tool carriages 22 at one end thereof. Each lead screw 30 is engaged by a rotatable nut 32 that is fixed against axial movement within the stanchion. On the periphery of the nut are gear teeth 34 which mesh with a worm 36 on a shaft 38 rotated by gearing 40 of which only a portion is shown.

It is to be understood that this configuration of the screw and nut is illustrative only, and that, in other applications the lead screw may be rotatably mounted in a tool support for rotation by a suitable driving means such as a worm and worm wheel. In such an arrangement the nut engaging the lead screw could be fixed nonrotatably to and move with a tool carriage mounted on the tool support.

The gearing 40 is driven by a change-gear transmission 42 and is identical for each of the tool carriages 22. The motor-driven transmission 42 is also connected to rotate and coordinate the rate of rotation of the work table 20 and the gear blank W mounted thereon with the rate of rotation of the nuts 32 engaging and moving the lead screws 30 that traverse the cutters across the face of the gear blank W to cut the desired helix angle accurately. If the temperature of the lead screw 30 changes during this feeding movement, it causes the helix angle of its own thread engaging the nut 32 to change producing more friction between them and causing either a faster or slower rate of feed of the tool carriage and cutter across the gear blank W, depending on whether the temperature increases or decreases, thereby producing an incorrect helix angle on the corresponding half of the double-helical gear blank being cut.

The invention also comprises apparatus for determining, controlling and maintaining the temperature of the lead screw 30 as will now be disclosed.

To each end of each of the lead screws 30 is clamped a flexible conduit 44 so that the respective conduits 44 form a passage for conveying fluid to and from each hollow lead screw 30 in any vertical position each lead screw may assume as the tool carriage 22 to which it is connected is traversed up and down by the interaction of lead screw 30 and the rotating nut 32. The other ends of each of the respective flexible conduits 44 are clamped to a rigid return conduit 48 and a rigid supply conduit 50, leading out of a housing 52 that houses the temperature controlling apparatus to be hereinafter described. Each of the lead screws 30 has its own separate temperature controlling apparatus housed in a separate housing 52 located adjacent one of the stanchions 16 and 18.

Referring now to FIG. 3, this view comprises a schematic representation of apparatus for controlling the temperature of a hollow lead screw shown in operative relation to the related portions of a hobbing machine including the hollow lead screw 30 and the rotatable nut 32 provided on its outer periphery with gear teeth 34 for engagement with a driving worm. In order to provide for ready correlation between the showing in FIG. 2 and the schematic representation in FIG. 3, the housing identified by reference numeral 52 in FIG. 2 with rigid conduits 48 and 50 projecting therefrom is represented in FIG. 3 by a dotted outline identified by reference numeral 52 and encompassing the various components of the instant invention contained within the housing 52.

From inspection of the showing in FIG. 3, it will be apparent that the apparatus for controlling the temperature of a lead screw characterizing the instant invention is composed of two principal assemblies including a fluid circulating system and a fluid temperature control system suitably interconnected. The various components in each of these systems will be enumerated briefly below prior to a description of the operation of the apparatus for controlling the temperature of a lead screw.

The fluid circulating system includes a fluid reservoir 54 either comprising or disposed within the lower portion of housing 52, a constant volume fluid delivery pump 56 driven by a suitable driving means not separately illustrated and controlled by switch SW1, a pipe 58, a heat exchanger assembly 60, a pipe 62, a temperature sensing device 64, and a passageway for circulating the fluid through the lead screw 30 including the respective rigid conduits 48 and 50 and the respective flexible conduits 44.

The fluid temperature control system includes a selectively operable manually adjustable temperature setting device 70 which may comprise a conventional thermostatic control unit, an error detecting device 68, a heating and cooling system 72 incorporating apparatus selectively operable to either heat or cool a suitable heat transfer medium for circulation through conduits 74 and 76 and thence through the heat exchanger assembly 60, and suitable connections between the respective elements including conduits 66 and 69 for transmitting signals from the temperature sensing device 64 and the temperature setting device 70, respectively, to the error detecting device 68, and a conduit 71 for transmitting a control signal from the error detecting device 68 to the heating and cooling system 72.

Inasmuch as the temperature sensing device, the temperature setting device such as a thermostatic control, the error detecting device, the heating and cooling system, the heat exchanger assembly, and the circulating pump may be selected from various well known types of commercially available items in these several categories, the specific features of these various components of the systems comprising the instant invention are neither described herein in detail nor illustrated in the various figures of the drawings.

The following description of the operation of the device comprising the instant invention can be considered most effectively in relation to the showing in FIG. 3.

A motor driven pump 56 started by closing a switch SW1 draws fluid from the reservoir 54 through a conduit 58 and circulates the fluid through the system at a constant volume. As the fluid leaves the pump 56 it passes through conduit 58, through a heat exchanger 60, through a pipe 62, to a temperature sensing device 64, through the rigid conduit 50 and the flexible conduit 44 at one end of the hollow lead screw 30, through the other flexible conduit 44 at the other end of screw 30, and through rigid conduit 48, to the reservoir 54.

The setting of the error detecting device 68 is controlled by a thermostat 70 that may be set at any desired temperature at will, the temperature sensing device continuously informing the error detecting device of the temperature of the fluid.

If the fluid is not of the desired temperature as called for by the setting of the thermostat 70, a signal is relayed by the error detector 68, starting either the heating or cooling apparatus of the heating and cooling system 72. The heating and cooling system 72 is conventional and selectively heats or cools its own fluid, as required, which passes through a pair of pipes 74 and 76 and through a suitable coil contained in a conventional heat exchanger 60 and immersed in the lead screw temperature controlling fluid passing through heat exchanger 60.

The fluid passes through the lead screw at a constant volume and at a uniform temperature and therefore the lead screw 30 is held at a uniform temperature notwithstanding local changes in temperature due to hot spots, friction of the nut 32 and the cutter 24 and its bearings and housing. It is desirable that the size of the passage in the lead screw be as large as possible and of a constant cross section area extending for at least the distance of its threaded portion to provide a uniform heat transfer throughout the threaded portion of the lead screw. When cutting a gear, if it is found that the lead of the helix angle is off due to either the lengthening or shortening of the lead screw 30, an adjustment is easily made by resetting the thermostat 70 to either increase or decrease the temperature of the circulating fluid as required to modify the rate of heat transfer in the proper sense to restore the lead screw to its proper dimension.

It is apparent from the foregoing description that the instant invention is a more practical and less expensive method of controlling and maintaining a predetermined temperature of lead screws, or feed screws of machine tools of any description, wherein extreme accuracy is a requirement.

While the preferred embodiment of the invention has been described above as it applies to one type of hobbing machine, it is to be understood that this invention is not limited to the particular construction shown and described, and that this invention applies to other adaptations, modifications and uses of the inventive concept disclosed herein within the scope of the appended claim.

What is claimed is:

In a gear-cutting machine including a rigid main frame; a work support rotatably mounted upon said main frame centrally thereof; spaced first and second tool supports adjustably fixedly secured to said main frame on opposite sides of said work support; first and second tool carriages each slidably mounted on one of said tool supports; and power transmission means operatively interconnecting said work support and said first and second tool carriages for effecting precisely coordinated movements of said work support and of said first and second tool carriages to move first and second cutting tools supported on and driven through the respective first and second tool carriages to finish first and second predetermined portions of a single gear blank mounted on said work support and engaged by both cutting tools to precisely controlled dimensions both within each portion of and between the first and second portions of the single gear blank; said power transmission means including operative connections with said first and second tool carriages comprising first and second single elongate lead screws and first and second means respectively coacting with the first and second single elongate lead screws for moving said first and said second tool carriages along said first and said second tool supports, respectively; the improvement comprising the provision of a central passage extending lengthwise from end to end of each said elongate lead screw so that said power transmission means includes first and second single hollow lead screws; and first and second fluid circulating systems respectively connected to said first and second hollow lead screws for circulating a temperature controlled fluid therethrough to maintain each lead screw at the desired precise dimension therefor; each fluid circulating system comprising a fluid reservoir, a constant volume pump, a heat exchanger, a temperature sensing device, fluid supply conduits interconnecting said reservoir, said pump, said heat exchanger, said temperature sensing device and one end of a given one of said hollow lead screws, a fluid return conduit interconnecting the other end of the given one of said hollow lead screws and said reservoir, and pump drive means operable to circulate a constant volume of fluid through said fluid circulating system; and first and second fluid temperature control systems; each said fluid temperature control system including an independently operable adjustable temperature setting device for controlling the temperature of the fluid circulated through a given one of said hollow lead screws and thereby the precise dimension of the given one of said lead screws, a heating and cooling system operatively connected to and selectively operable to circulate a heating or a cooling medium through said heat exchanger, an error detector operatively connected to and responsive to signals from said temperature sensing device and said temperature setting device and operatively connected to said heating and cooling system to actuate said heating and cooling system in the sense necessary to equalize the temperature detected by the temperature sensing device and the temperature indicated by the associated temperature setting device; whereby the precise dimension of each said lead screw may be adjusted and thereafter stabilized under given operating conditions by suitable adjustment of one said temperature setting device independent of the adjustment of the precise dimension of the other said lead screw so as to even more precisely control the finish dimensions within and the dimensional relationship between first and second predetermined portions of a single gear blank.

References Cited in the file of this patent

UNITED STATES PATENTS

| | | |
|---|---|---|
| 1,112,269 | Crellin | Sept. 29, 1914 |
| 2,330,168 | Zimmermann | Sept. 21, 1943 |
| 2,606,747 | Williams | Aug. 12, 1952 |

FOREIGN PATENTS

| | | |
|---|---|---|
| 1,013,941 | Germany | Aug. 14, 1957 |
| 1,036,604 | Germany | Aug. 14, 1958 |